United States Patent [19]

Efner

[11] Patent Number: 5,068,274

[45] Date of Patent: Nov. 26, 1991

[54] SECONDARY AMIDES IN POLYETHYLENE TEREPHTHALATE MOLDING COMPOSITIONS

[75] Inventor: Howard F. Efner, Bartlesville, Okla.

[73] Assignee: Phillips Petroleum Company, Bartlesville, Okla.

[21] Appl. No.: 544,498

[22] Filed: Jul. 19, 1990

[51] Int. Cl.$^5$ .............................................. C08K 5/20
[52] U.S. Cl. .................................. 524/230; 524/605; 525/444
[58] Field of Search .................. 524/230, 210, 605; 525/444, 170

[56] References Cited

U.S. PATENT DOCUMENTS

| | | | |
|---|---|---|---|
| Re. 32,334 | 1/1987 | Deyrup | 524/292 |
| 3,565,852 | 2/1971 | Conix | 525/444 |
| 4,129,715 | 12/1978 | Chen et al. | 528/67 |
| 4,223,113 | 9/1980 | Bier et al. | 525/444 |
| 4,338,243 | 7/1982 | Hecht et al. | 524/210 |
| 4,447,572 | 5/1984 | Scharf et al. | 524/371 |
| 4,528,346 | 7/1985 | Sugie et al. | 525/523 |
| 4,547,547 | 10/1985 | Chen et al. | 524/538 |
| 4,769,403 | 9/1988 | Luise | 524/410 |

*Primary Examiner*—Veronica P. Hoke
*Attorney, Agent, or Firm*—Morrison Bennett

[57] ABSTRACT

Reinforced polyethylene terephthalate molding resin compositions with glossy surface are provided which crystallize rapidly after being injection molded and which have engineering resin performance characteristics. In addition to polyethylene terephthalate and glass fibers, the compositions contain an aliphatic polyester, an ionic hydrocarbon polymer, an antioxidant, and a secondary amide. Optionally, the compositions may contain a portion of glass flakes, mica or other filler. The compounds can be flame retarded with a brominated polystyrene and an antimonate without substantial change in properties.

70 Claims, No Drawings

SECONDARY AMIDES IN POLYETHYLENE TEREPHTHALATE MOLDING COMPOSITIONS

BACKGROUND OF THE INVENTION

This invention relates to reinforced polyethylene terephthalate molding compositions.

Polyethylene terephthalate molding compositions which are reinforced with glass fibers, asbestos fibers, or other fibrous mineral material are known to either crystallize slowly and give molded articles with a resin rich glossy surface finish, inferior mechanical properties and slow molding cycles, or to rapidly crystallize, giving molded articles with good mechanical properties and short molding cycles but low gloss surface finish. One method of improving surface gloss is to increase the mold temperature but this can result in longer cooling times. It is also known that molding wet polyethylene terephthalate produces parts with good gloss but poor mechanical properties.

It is difficult to make fiber reinforced polyethylene terephthalate molding compositions which will rapidly crystallize and which give molded articles which display high surface gloss and good physical and mechanical properties. Processability, shorter cycle times and better flow properties are important. Thus, even when a particular polyethylene terephthalate molding composition is molded into articles which display both good surface finish characteristics and some good strength characteristics, the articles may not possess the combination of thermal, electrical and mechanical properties required for many commercial applications. For example, in engineering resin applications, a glass fiber reinforced polyethylene terephthalate molding composition needs to have good spiral flow and rapid crystallization; it should provide molded articles with attractive surface appearance, high heat distortion temperature and minimal warpage after the part is removed from a mold.

There is a need for reinforced polyethylene terephthalate molding compositions from which can be made articles with high surface gloss and engineering resin performance characteristics. Also, there is a need for compositions of this type which display high flow rates under molding conditions without water addition and without lubricant addition. In addition, these compositions should also be capable of having a flame retardant material added thereto in an amount effective for achieving flame retardancy without a significant change in the combination of properties exhibited by articles molded from the composition. There is also a need for compositions of this type which can be colored without significantly changing properties of the composition or articles molded from the composition while retaining good processability.

SUMMARY OF THE INVENTION

An object of the present invention is to provide a new and improved class of reinforced polyethylene terephthalate molding compositions which have rapid crystallization, good processability, good flow rates, and from which can be made molded articles having an excellent combination of good surface gloss, good physical and mechanical properties and high heat distortion temperatures.

Another object is to provide such a composition which can be readily prepared by melt extrusion.

Another object is to provide a reinforced polyethylene terephthalate molding composition which has good processability, is rapidly crystallizable, has outstandingly high flow rates under molding conditions, and which can be molded into articles having good surface gloss and engineering resin performance charactertistics.

Another object is to provide such a composition which can be flame retarded by the addition of additives which when so added do not cause a significant change in desired properties.

Another object is to provide such a composition which can be colored by the addition of additives which when so added do not cause a significant change in desired properties.

Another object is to provide processes for making and using such compositions.

Another object is to provide articles made from such compositions.

In accordance with one embodiment of this invention, a molding composition which has a high injection molding flow rate and which can be molded into articles with a glossy surface and engineering resin performance characteristics comprises:

(a) polyethylene terephthalate;

(b) filler;

(c) an aliphatic polyester having a number average molecular weight in the range from about 7,500 to about 20,000 and which is a condensation product of an alkanedioic acid containing from 8 to about 12 carbon atoms per molecule and an alkanediol containing from 2 to about 5 carbon atoms per molecule;

(d) a metal salt of an ionic hydrocarbon copolymer of an alpha-olefin containing from 2 to about 5 carbon atoms per molecule and an alpha,beta-ethylenically unsaturated carboxylic acid containing from 3 to about 5 carbon atoms per molecule in which copolymer the neutralized anionic carboxyl groups are associated with cations of said metal, said copolymer having a number average molecular weight in excess of about 3,000 prior to neutralization, said metal being selected from the group consisting of sodium and potassium;

(e) an antioxidant; and (f) a secondary amide described by the formula:

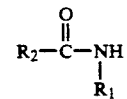

wherein $R_1$ and $R_2$ may be the same or different and represent alkyl groups or unsaturated aliphatic groups containing from 8 to 36 carbon atoms and preferably 12 to 22 carbon atoms, and wherein each said unsaturated group can have up to three double bonds.

Optionally, the inventive compositions may be flame retarded and/or colored.

DETAILED DESCRIPTION OF THE INVENTION

The present invention is directed to a class of new and very useful molding compositions of reinforced polyethylene terephthalate which have a high flow rate under molding conditions, good mold release characteristics, a rapid crystallization rate after being injection molded, and can be molded into articles which have a surprising and unexpectedly good surface finish as well as acceptable engineering resin performance characteristics, such as good physical strength and high heat distortion temperature.

A good surface finish, among other advantages, is useful for the fabrication of parts where visual appearance is important, such as exterior automotive, motorcycle, bicycle, appliance and furniture parts.

Among other advantages, a high molding flow rate permits an injected resin to fill all cavities of an intricate mold, as those skilled in the art readily appreciate. A blended, melt-extruded, pelletized composition of this invention can be conventionally injection molded, for example, using an injection molding temperature range from about 520° to 580° F. into molds typically ranging in surface temperature from about 180° to about 280° F.

In addition, articles made from the molding compositions of this invention retain to an unexpected and remarkable extent an acceptable combination of physical and mechanical properties when one or more of a selected class of secondary amides are included in the compound. This result from use of secondary amides is particularly unexpected because primary amides are known to compromise physical properties when used to produce good gloss. Secondary amides surprisingly can be used to improve gloss without causing significant loss of desired physical properties. Deyrup (Re 32,334) teaches that secondary amides in polyethylene terephthalate give molded articles a rough surface finish.

More particularly, the molding resin compositions of this invention generally comprise:

(a) from about 30 to about 90 weight percent, more preferably from 35 to 65 weight percent, based on total weight of the composition, of polyethylene terephthalate having an intrinsic viscosity of at least about 0.25;

(b) from about 5 to about 65 weight percent, more preferably from 10 to 60 weight percent, based on total weight of the composition, of a filler;

(c) from about 0.5 to about 15 pph resin, more preferably from 2.5 to 10 pph resin, of an aliphatic polyester having a number average molecular weight ranging from about 7,500 to about 20,000 and which is a condensation product of an alkanedioic acid containing from 8 to about 12 carbon atoms per molecule and an alkanediol containing from 2 to about 5 carbon atoms per molecule;

(d) from about 0.1 to about 3 pph resin, more preferably 0.2 to 1.2 pph resin, of a metal salt of an ionic hydrocarbon copolymer of an alpha-olefin containing from 2 to 5 carbon atoms per molecule and an alpha,beta-ethylenically unsaturated carboxylic acid containing from 3 to about 5 carbon atoms per molecule in which copolymer the neutralized anionic carboxyl groups are associated with cations of said metal, said polymer having a molecular weight before such neutralization of at least about 3,000, said metal being selected from the group consisting of sodium and potassium;

(e) from about 0.01 to about 2 pph resin, more preferably from 0.2 to 1.0 pph resin, of an antioxidant; and (f) from about 0.1 to about 5 pph resin, more preferably from about 0.5 to about 3 pph resin, most preferably 1 to 3 pph resin, of a secondary amide described by the formula:

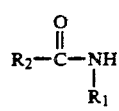

wherein $R_1$ and $R_2$ may be the same or different and represent alkyl groups or unsaturated aliphatic groups containing from 8 to 36 carbon atoms and preferably 12 to 22 carbon atoms, and wherein each said unsaturated group can have up to three double bonds.

By "pph resin" or "pphr" as used herein is meant the parts by weight of specified components per 100 parts by weight of polyethylene terephthalate.

To flame retard a composition of this invention, one can admix therewith from greater than 0 to about 50 pph resin, more preferably from about 25 to about 35 pph resin, of a composition consisting essentially of:

(i) brominated polystyrene having a number average molecular weight ranging from about 10,000 to about 400,000, and having a bromine content in the range from about 55 to about 75 weight percent (based on total weight of the brominated polystyrene), and (ii) antimonate of at least one metal selected from Group I, Group II, and Group VII of the Periodic Table; wherein the weight ratio of said brominated polystyrene to said antimonate ranges from about 2:1 to about 12:1, and more preferably, from about 3:1 to about 10:1.

Other flame retardants are also contemplated as useful in this invention.

To color a composition of this invention, one can admix therewith from greater than 0 to about 10 weight percent, more preferably from about 0.05 weight percent to about 8 weight percent, based on total weight of the composition, of a colorant. The amount of colorant which is preferable will vary widely, depending on the widely varying concentrations in the colorants available.

The Polyethylene Terephthalate

The polyethylene terephthalate employed herein generally has an inherent viscosity of at least about 0.25, preferably about 0.4 as measured by ASTM D-2857. The polyethylene terephthalate perferably has an upper limit on inherent viscosity of about 1.2. Inherent viscosity is measured in a 3:1 volume ratio of methylene chloride and trifluoroacetic acid at 30° C. The term "polyethylene terephthalate" as used herein is used generally to include high molecular weight polymers made by condensing ethylene glycol with terephthalic acid or dimethylterephthalate no matter how prepared. This term is meant to include polyethylene terephthalate polymers which are modified by the inclusion of minor amounts, e.g., less than about 20 percent by weight of the polymer, of comonomers or modifying agents. Such comonomers or modifying agents include various diols such as 1,4-butanediol, cyclohexane dimethanol, diethylene glycol, polyalkylene oxide, neopentyl glycol, butylene glycol, and 1,3-propanediol or mixtures of two or more diols. Likewise, such comonomers or modifying agents can include various diacids such as isophthalic acid, adipic acid, sebacic acid, 2,6-naphthalene dicarboxylic acid and p-hydroxy benzoic acid. Mixtures of two or more diacids may be used. Mixtures of polyethylene terephthalate resins can be used. Suitable polyethylene terephthalate polymers are commercially available.

Filler

Conventional fillers known in the art can be used. Examples of non-fibrous, inorganic fillers include clay, mica, talc, kaolin, calcium carbonate, barytes, ceramic spheres, glass spheres, glass flakes, calcium silicate, and the like. Mixtures of two or more non-fibrous inorganic fillers can be used.

Examples of non-fibrous organic fillers include wood and shell flours, starches, carbohydrate by-products, synthetic organics, such as polyvinylidene chloride spheres, and the like. Mixtures of two or more non-fibrous ogranic fillers can be used.

Examples of metal powders, flakes, or fibers include aluminum, bronze, zinc, nickel, stainless steel, and the like. Mixtures of two or more metal can be used. Oxides of metals such as titanium dioxide, zinc oxide, and the like are also contemplated as useful. Mixtures of two or more metal oxides can be used. Also, mixtures of metals and metal oxides can be used.

Examples of fibrous fillers include those comprised of aramid, carbon, glass, hybrids (such as aramid/carbon, aramid/carbon/glass, aramid/glass, carbon/glass, and the like), boron, ceramic, metal, Wollastonite, mixtures thereof and the like.

Mixtures of organic and inorganic fillers can be used. Also useful are mixtures of fibrous and non-fibrous fillers, including such combinations as glass fibers and glass flakes, glass fibers and mica, glass fibers and Wollastonite, glass fibers and glass spheres, and the like. Metal fillers, metal oxide fillers and mixtures of these can be combined with other fibrous or non-fibrous fillers or with other organic or inorganic fillers or with various mixtures of fillers from these categories.

When mixtures of more than one filler are used, the proportionate amounts of the fillers will vary according to the form and properties of the fillers and according to the properties desired in the articles to be made from the polyethylene terephthalate molding composition. For example, in a composition comprising:

(a) from about 30 to about 90 weight percent based on total weight of the composition of polyethylene terephthalate;

(b) from about 5 to about 65 weight percent, based on total weight of the composition, of filler;

(c) from about 0.5 to about 15 pph resin of an aliphatic polyester;

(d) from about 0.1 to about 3 pph resin of a metal salt of an ionic hydrocarbon copolymer;

(e) from about 0.01 to about 2 pph resin of an antioxidant;

(f) from about 0.1 to about 5 pph resin of a secondary amide; the filler can comprise a mixture of mica and fiber glass having a ratio of mica to fiber glass from about 10:1 to about 1:10.

The glass fibers presently preferred have an average cross-sectional thickness in the range from about 7 to 15 microns, preferably from about 8 to about 10 microns and an average length in the range from about 2 to about 8 millimeters, preferably from about 2.5 to about 5 millimeters. Such glass fibers are commercially available.

The Aliphatic Polyester

The aliphatic polyesters have a number average molecular weight in the range from about 7,500 to about 20,000, preferably about 8,000 to about 10,000 and comprise condensation products of alkanedioic acids containing from 8 to about 12 carbon atoms per molecule and alkanediols containing from 2 to about 5 carbon atoms per molecule. Preferred alkanedioic acid comonomers for such polyesters contain 8 to 10 carbon atoms per molecule and preferred alkanediol comonomers for such polyesters contain 3 to 4 carbon atoms per molecule. One presently most preferred such polyester is a condensation product of sebacic acid and 1,2-propanediol. Characteristically, the aliphatic polyester is liquid at ambient conditions.

The Ionic Hydrocarbon Copolymer

The ionic hydrocarbon copolymer contemplated as useful is a metal salt of an ionic hydrocarbon copolymer of an alpha-olefin containing from 2 to about 5 carbon atoms per molecule and an alpha,beta-ethylenically unsaturated carboxylic acid containing from 3 to about 5 carbon atoms per molecule in which copolymer the neutralized anionic carboxyl groups are associated with cations of the metal with the copolymer having a number average molecular weight in excess of about 3,000 prior to neutralization, and with the metal being selected from the group consisting of sodium and potassium.

Representative ionic hydrocarbon copolymers comprise the sodium and/or potassium salts of copolymers of olefins (especially ethylene) with acrylic acid, methacrylic acid, or mixtures thereof which are at least about 30 percent neutralized. Suitable copolymers are commercially available.

The aliphatic polyester and the ionic hydrocarbon copolymer (also known as ethylene acid copolymer or ionomer) in combination with polyethylene terephthalate induce rapid crystallization of the polyethylene terephthalate so that melt injection of the composition into a mold having a surface temperature of about 110° C. results in molded products with good properties. Typical cycle times at such a mold temperature are characteristically not more than about 30 seconds.

The Antioxidant

Many different antioxidants can be used. In general, preferred antioxidants are thermally stable at the processing temperature employed. Hindered phenol antioxidants are presently preferred. The antioxidant which is presently most preferred is available from Ciba-Geigy Corporation as "Irganox 1010", the active component of which is believed to be tetrakis (methylene 3-[3,5-di-t-butyl-4-hydroxyphenyl] propionate) methane. Other suitable antioxidants include:

(A) Borg Warner's "Ultranox 626", the active agent of which is bis[2,4-di-t-butyl phenyl pentaerythritol] diphosphite;

(B) Ciba-Geigy's "Irganox 259", the active agent of which is 1,6-hexamethylene bis(3,5-di-t-butyl-4-hydroxy-hydrocinnamate) and/or 1,6-hexamethylene bis(3-[3,5-di-t-butyl-4-hydroxyphenyl]-propionate);

(C) Ferro Corporation's "Oxi-Chek 116", the active agent of which is octadecyl 3,5-di-t-butyl-4-hydroxy-hydrocinnamate; and (D) Ciba-Geigy's "Irganox 1098", the active agent of which is N,N'-hexamethylene bis[3,5-di-t-butyl-4-hydroxy-hydrocinnamide].

The Secondary Amides

The secondary amides which can be employed herein are those described by the formula:

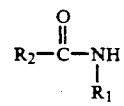

wherein $R_1$ and $R_2$ may be the same or different and represent alkyl groups or unsaturated aliphatic groups containing from 8 to 36 carbon atoms and preferably 12 to 22 carbon atoms, and wherein each said unsaturated group can have up to three double bonds.

Examples of secondary fatty amides suitable for use herein include, but are not limited to, N-stearyl stearamide, N-stearyl erucamide, N-erucyl erucamide, N-oleyl palmitamide, N-oleyl hydroxypalmitamide, N-stearyl oleamide, N-erucyl stearamide, N-oleyl oleamide, N-palmityl palmitamide, N-behenyl behenamide, N-behenyl erucamide, N-oleyl stearamide, N-oleyl behenamide, N-erucyl behenamide, N-capryl stearamide, N-lauryl myristamide, N-margaryl arachidamide, N-tricosanyl nonadecanamide and the like. Mixtures of two or more secondary amides can also be used. Preferred secondary fatty amides include N-stearyl stearamide, N-oleyl palmitamide, and N-erucyl erucamide, which are commercially available as Kemamide TM S-180, Kemamide TM P-181 and Kemamide TM E-221, respectively.

The Flame Retardant

In the present application, the presently preferred flame retardant comprises brominated polystyrene with an antimonate synergist.

The Brominated Polystyrene

Preferably, the bromine content of the brominated polystyrene is at least about 60 weight percent of such polymer. Preferably, such polymer has a number average molecular weight ranging from about 10,000 to about 400,000, preferably about 225,000 to about 350,000. Such brominated polystyrenes are available commercially.

For purposes of achieving flame retardancy, the combined weight of the brominated polystyrene and the antimonate (see below) in a resin blend is preferably at least about 4 weight percent of the total resin blend. A presently preferred weight ratio of brominated polystyrene to antimonate compound(s) is from about 3:1 to about 10:1.

The Antimonate

A presently particularly preferred antimonate is sodium antimonate although zinc antimonate and nickel antimonate and mixtures thereof are also preferred. The antimonate is usually employed in a finely-divided particulate or powder form.

Other Additives

Optionally, to increase impact strength, compositions of this invention can additionally contain from greater than 0 to about 5 weight percent of a polymeric epoxy compound of the type comprised of a condensation product of bisphenol A with epichlorohydrin. The average number of repeating units of bisphenol A/epichlorohydrin per molecule in such a condensate can range from about 0.1 to about 20. Such polymeric epoxy compositions are commercially available. Examples include the trademarked products "Epon 828," "Epon 1001F," and "Epon 1009F" available from Shell Chemical Company.

The compositions of this invention can also optionally contain an amount of polyethylene sufficient to obtain physical properties tailored for particular applications or to improve processability, if desired. Presently preferred is from greater than zero to about 10 pph resin. Preferably the polyethylene has a molecular weight ranging from about 600 to 3,000. Such polymers are commercially available. Examples include the trademarked materials "Epolene N34" or "Epolene C-10" from Eastman Chemical Company and "Polywax 500", "Polywax 655", and "Polywax 1000" from Petrolite Specialties Polymers Group.

In addition to the components discussed herein, the compositions of this invention may contain other additives commonly employed (and in the quantities known to the art or sufficient to achieve the desired result) with polyethylene terephthalate. Examples include colorants such as carbon black or blue concentrate, heat and ultraviolet light stabilizers, and the like. Usually, the total quantity of such other additives is not more than about 20 weight percent of the total weight of the composition, although higher amounts could be used if desired.

Preparation

The compositions of this invention are prepared by blending together the components by any convenient means. For example, dry polyethylene terephthalate can be dry mixed in any suitable blender or tumbling means with the other components and the resulting mixture melt-extruded. Alternatively, all components except the glass or other filler can be mixed by conventional means and the glass or other filler then added to the already molten resin mixture. Preferably, the polyethylene terephthalate is preblended with the glass fibers and then dry mixed with the other additives before melt-extrusion. A convenient melt-extrusion temperature range is about 520° to 580° F. The extrudate is preferably in a strand form which can be chopped into pellets or the like as desired.

Composition

The molding resin compositions of this invention are summarized in the following Table 1:

TABLE 1

| Polyethylene Terephthalate Molding Resin Compositions | | |
|---|---|---|
| | Amounts | |
| Component | Broad Range | Preferred Range |
| Polyethylene Terephthalate, wt %[a] | 30–90 | 35–65 |
| Fillers, wt %[a] | 5–65 | 10–60 |
| Aliphatic Polyester, pph resin | 0.5–15 | 2.5–10 |
| Ionic Hydrocarbon Copolymer, pph resin | 0.1–3 | 0.2–1.2 |
| Antioxidant, pph resin | 0.01–2 | 0.2–1.0 |
| Secondary Amide, pph resin | 0.1–5 | 0.5–3 |
| Flame Retardant[b,c], pph resin | 0–50 | 25–35 |
| Colorants[b], wt %[a] | 0–10 | 0.05–8 |
| Other Additives[b], wt %[a] | 0–20 | |

[a]Based on total weight of the composition.
[b]Optional.
[c]This includes the brominated compound and the antimony synergist.

EXAMPLES

The following examples describe the invention and should be taken as illustrative and not restrictive.

Components

Runs were made using the various combinations and amounts of ingredients shown in the following examples.

Compounding

The polyethylene terephthalate resin was vacuum dried for about 16 hours at 250° F. prior to compounding. Other dessicant or dehumidifing drying methods are acceptable. The dry resin was removed from the drying oven, then quickly tumble blended with the other ingredients prior to compounding in a 1.5 inch 24:1 l/d Davis Standard extruder equipped with a single stage mixing screw and strand die. The melt temperature range was about 520° to 540° F. The mixture was either flood fed or metered to the extruder using a volumetric feeder. A nitrogen blanket was used to protect the polyethylene terephthalate resin from moisture absorption in the feeder or hopper. The extruded strands were briefly quenched in a water bath, allowed to dry using latent heat, and pelletized into approximately ⅛ inch pellets.

Molding

The pelletized compositions were dried overnight in a dehumidifing oven at 225° F. prior to injection molding. Test specimens were molded in standard molds on a 55-ton hydraulic clamp 2.9 ounce injection molding press, with a mold surface temperature of about 235° F. and a cylinder temperature of about 540° F. The dry molding composition was protected from moisture by a dry nitrogen blanket on the machine hopper. A fast injection speed was used with about 5-second injection time, about 4-second hold time, and about 25-second cooling time. Injection pressure was adjusted for mold filling. Holding pressure was about 80% of injection pressure.

Property Testing

Spiral flow measurements were done on a 0.250 in. ×0.060 in. spiral flow mold in a 55-ton injection molding machine. Mold surface temperature was about 235° F. and melt temperature was about 540° F. A fast injection speed was used with an injection time of about 5 seconds, no hold time, and about 17 seconds cooling time. The average flow length of 10 parts was taken after the machine had stabilized. Measurements were taken at hydraulic pressures of about 500, 1000, and 1500 psi which corresponded to injection pressures of about 6,750, 13,500, and 20,250 psi.

Surface appearance was visually rated on test parts molded under the conditions described above. Scanning electron microscope photomicrographs with a 100x magnification were made of the surfaces of parts molded from two of the inventive compositions and from two control compositions. Surface appearance ranged from dull to glossy.

The properties of molded test specimens were determined by ASTM procedures.

EXAMPLE 1

This example describes two inventive compositions and a third composition which does not contain a gloss improver additive. The compositions are designated, as A, B and C. Table 2 lists the components and the amounts of each in the compositions. Footnotes to Table 2 further identify the components and indicate commercial sources.

The inventive compositions A and B in Table 2 contain, respectively, 0.3 weight percent N-stearyl stearamide (Kemamide TM S-180) and 0.3 weight percent N-erucyl erucamide (Kemamide TM E-221). The major component in Kemamide TM E-221 is N-13-docosenyl-13-docosenamide. These commercially available secondary amides are responsible for enhancing the surface gloss of molded articles made from the inventive compositions A and B.

The remaining components of the compositions in Table 2 comprise polyethylene terephthalate resin, glass fiber filler, mica filler, nucleating agent, antioxidant and plasticizer.

The designation "weight percent" indicates the weight percent of the various components based on the total weight of the composition. The designation "pphr" indicates the parts by weight of the specified components per 100 parts by weight of the resin.

TABLE 2

Polyethylene Terephthalate Compositions with Secondary Amide Glass Improvers

|  | A Invention | B Invention | C Blank |
|---|---|---|---|
| Polyethylene Terephthalate[a], wt. % | 58.3 | 58.3 | 58.6 |
| Glass[b], wt. % | 15.0 | 15.0 | 15.0 |
| Mica[c], wt. % | 20.0 | 20.0 | 20.0 |
| Formion TM 105[d], wt. % | 0.6 | 0.6 | 0.6 |
| Irganox TM 1010[e], wt. % | 0.6 | 0.6 | 0.6 |
| Paraplex TM G-25[f], wt. % | 4.2 | 4.2 | 4.2 |
| Kemamide TM S-180[g], wt. % | 0.3 |  |  |
| Kemamide TM E-221[h], wt. % |  | 0.3 |  |
| Black Color Concentrate[i], wt. % | 1.0 | 1.0 | 1.0 |

[a]Polyethylene Terephthalate is Traytuf TM 5900 commercially available from Goodyear.
[b]Glass fiber is 993 commercially available from Certainteed.
[c]Mica is KMG 40K Mica commercially available from KMG Minerals, Inc., Kings Mountain, N.C.
[d]Ionic hydrocarbon copolymer commercially available from A. Schulman, Inc.
[e]Antioxidant commercially available from Ciba-Geigy Corporation.
[f]Aliphatic Polyester commercially available from C. P. Hall.
[g]Stearyl stearamide commercially available from Humko Chemical Division of Witco Corporation.
[h]Erucyl erucamide commercially available from Humko Chemical Division of Witco Corporation.
[i]Black color concentrate is 21% carbon black in polyethylene terephthalate commercially available from Reed Plastics as CPET 01333.

EXAMPLE 2

This example shows the physical and mechanical properties of molded articles prepared from two inventive compositions and a third composition which does not contain a gloss improver additive. The compositions are designated, as A, B and C in Table 3. These compositions are the same as those shown in Example 1 and Table 2.

Attention is called to the enhanced surface appearance of the samples molded from the inventive compositions A and B. The rating of "glossy" was assigned by visual observation to molded samples from A and B, whereas the surface of molded samples from the composition C (containing no gloss improver) was rated as "dull". This difference in surface appearance is attributable to the presence of the secondary amides in inventive compositions A (N-stearyl stearamide additive) and B (erucyl erucamide additive).

It is noteworthy that, in general, properties other than surface appearance in the properties of molded samples from all three compositions A, B and C were comparable.

TABLE 3

Physical and Mechanical Properties of Polyethylene Terephthalate Compositions with Secondary Amides

|  | A[a] Invention | B[a] Invention | C[b] Blank |
|---|---|---|---|
|  |  | Weight % |  |
| Polyethylene Terephthalate[c] | 58.3 | 58.3 | 58.6 |
| Glass[d] | 15.0 | 15.0 | 15.0 |
| Mica[e] | 20.0 | 20.0 | 20.0 |
| Formion TM 105[f] | 0.6 | 0.6 | 0.6 |

TABLE 3-continued

Physical and Mechanical Properties of Polyethylene Terephthalate Compositions with Secondary Amides

| | A[a] Invention | B[a] Invention | C[b] Blank |
|---|---|---|---|
| | | Weight % | |
| Irganox TM 1010[g] | 0.6 | 0.6 | 0.6 |
| Paraplex TM G-25[h] | 4.2 | 4.2 | 4.2 |
| Kemamide TM S-180[i] | 0.3 | | |
| Kemamide TM E-22[j] | | 0.3 | |
| Black Color Concentrate[k] | 1.0 | 1.0 | 1.0 |
| Physical | | | |
| Flow rate, | 68 | 68 | 64 |
| g/10 min. at 275° C. 5 Kg | | | |
| DSC Measurements, °C. | | | |
| Tg | 77 | 80 | 79 |
| Tcc | 125 | 125 | 125 |
| Tm | 252 | 253 | 251 |
| Tmc | 209 | 209 | 208 |
| Crystallization Window, wt. % | 48 | 49 | 48 |
| Heat Distortion Temperature, °C. @ 1820 KPa | 198 | 196 | 189 |
| Surface | glossy | glossy | dull |
| Mechanical | | | |
| Tensile Break, KSI | 13.1 | 13.1 | 12.8 |
| Tensile Elongation, % | 3.5 | 3.5 | 3.3 |
| Flexural Strength, KSI | 20.1 | 20.5 | 20.2 |
| Flexural Modulus, MSI | 1.3 | 1.3 | 1.3 |
| Izod Impact | | | |
| Notched Ft. Lb./In. | 0.8 | 0.8 | 0.8 |
| Unnotched Ft. Lb./In. | 5.6 | 5.4 | 5.3 |

Notes for Table 3
[a]A and B contain secondary amide additives.
[b]C contains no gloss improver additive.
[c]Polyethylene terephthalate is Traytuf TM 5900 commercially available from Goodyear.
[d]Glass fiber is 993 commercially available from Certainteed.
[e]Mica is KMG 40K Mica commercially available from KMG Minerals, Inc., King's Mountain, N.C.
[f]Ionic hydrocarbon copolymer commercially available from A. Schulman, Inc.
[g]Antioxidant commercially available from Ciba-Geigy Corporation.
[h]Aliphatic Polyester commercially available from C. P. Hall.
[i]Stearyl stearamide commercially available from Humko Chemical Division of Witco Corporation.
[j]Erucyl erucamide commercially available from Humko Chemical Division of Witco Corporation.
[k]Black color concentrate is 21% carbon black in polyethylene terephthalate commercially available from Reed Plastics as CPET 01333.

EXAMPLE 3

This example presents the electrical properties of molded articles prepared from two inventive compositions and a third composition which does not contain a gloss improver additive. The compositions are A, B and C and are the same compositions as those shown as A, B and C in Examples 1 and 2.

It is noteworthy that the inventive compositions A and B gave molded samples which exhibited comparable electrical properties to samples molded from composition C which contained no gloss improver. The A, B and C systems gave similar results in spiral flow values and hydrolytic stability testing (see Table 4).

It can be concluded from the information in Examples 1, 2 and 3 that the incorporation of secondary amides such as N-stearyl stearamide and erucyl erucamide into the polyethylene terephthalate molding compositions ultimately results in molded articles exhibiting an excellent glossy appearance without sacrificing any performance in physical, mechanical and electrical properties.

TABLE 4

Physical and Electrical Properties of Polyethylene Terephthalate Compositions with Gloss Improvers

| | A[a] Invention | B[a] Invention | C[b] Blank |
|---|---|---|---|
| Polyethylene Terephthalate[c], wt. % | 58.3 | 58.3 | 58.6 |
| Glass[d], wt. % | 15.0 | 15.0 | 15.0 |
| Mica[e], wt. % | 20.0 | 20.0 | 20.0 |
| Formion TM 105[f], wt. % | 0.6 | 0.6 | 0.6 |
| Irganox TM 1010[g], wt. % | 0.6 | 0.6 | 0.6 |
| Paraplex TM G-25[h], wt. % | 4.2 | 4.2 | 4.2 |
| Kemamide TM S-180[i], wt. % | 0.3 | | |
| Kemamide TM E-22[j], wt. % | | 0.3 | |
| Black Color Concentrate[k], wt. % | 1.0 | 1.0 | 1.0 |
| Dielectric Strength | | | |
| 1/16 in., Volts/mil | 623 | 635 | 641 |
| Dielectric Constant | | | |
| 1 KHz | 4.30 | 4.02 | 4.30 |
| 1 MHz | 4.04 | 3.81 | 4.03 |
| Dissipation Factor | | | |
| 1 KHz | 0.019 | 0.017 | 0.0177 |
| 1 MHz | 0.004 | 0.0038 | 0.0039 |
| Resistivity | | | |
| Volume, ohm/cm | E + 15 | E + 15 | E + 15 |
| Surface, ohm/sq cm | E + 14 | E + 14 | E + 14 |
| Insulation Resistance | E + 11 | E + 11 | E + 11 |
| Arc Resistance, Seconds | 137 | 138 | 138 |
| Arc Tracking Rate | | | |
| Spiral Flow, In. at | | | |
| 6,750 PSI | 9¼ | 10¼ | 9 |
| 13,500 PSI | 13¾ | 14¼ | 13½ |
| 20,250 PSI | 17½ | 18¼ | 17 |
| Hydrolytic Stability, % Tensile at | | | |
| 160° F. 21 day 95% relative humidity | 77 | 78 | 74 |

Notes for Table 4
[a]A and B contain secondary amide additives.
[b]C contains no gloss improver additive.
[c]Polyethylene terephthalate is Traytuf TM 5900 commercially available from Goodyear.
[d]Glass fiber is 993 commercially available from Certainteed.
[e]Mica is KMG 40K Mica commercially available from KMG Minerals, Inc., Kings Mountain, N.C.
[f]An ionic hydrocarbon copolymer commercially available from A. Schulman, Inc.
[g]Antioxidant commercially available from Ciba-Geigy Corporation.
[h]An Aliphatic Polyester commercially available from C. P. Hall.
[i]Stearyl stearamide commercially available from Humko Chemical Division of Witco Corporation.
[j]Erucyl erucamide commercially available from Humko Chemical Division of Witco Corporation.
[k]Black color concentrate is 21% carbon black in polyethylene terephthalate commercially available from Reed Plastics as CPET 01333.

EXAMPLE 4

This example demonstrates that the secondary amide additives of the inventive compositions cannot be replaced with related primary amides.

Although essentially no difference can be seen in the mechanical properties of the molded articles at the 0.5 pphr level of the different amide-type additives (see "Test Results" in Table 5 and Table 6), at the 1.0 pphr additive level the secondary amide additives are superior to the primary amide additives.

Referring to the results shown in Tables 5 and 6, at the 0.5 pphr amide additive level the flexural strength and tensile break properties of molded samples from the systems containing the different types of amides were comparable.

However, referring to the results shown in Table 7 at the 1.0 pphr amide additive level, the flexural strength and tensile break properties of molded samples from the systems containing the primary amide additives were significantly lower than the same properties of samples molded from the inventive compositions containing the secondary amide additives.

It can thus be concluded from the data of Table 7 that the incorporation of primary amides such as Kemamide ™ E and Kemamide ™ B into the polyethylene terephthalate molding compositions at the 1.0 pphr levels ultimately results in molded articles exhibiting reduced tensile break and flexural strength properties compared to the properties of molded articles made from analogous inventive compositions containing secondary amides. This decrease in mechanical properties more than off-sets any enhancement of gloss that might accompany the use of primary amide additives in polyethylene terephthalate molding compositions.

TABLE 5

Comparison of Primary Amides and Secondary Amides as Gloss Improvers in PET Compositions

|  | A[a] Control | B[b] Invention | C[a] Control |
|---|---|---|---|
|  |  | Weight % |  |
| Polyethylene Terephthalate[c] | 40.1 | 40.1 | 40.1 |
| Glass[d] | 55.0 | 55.0 | 55.0 |
| Formion ™ 105 | 0.4 | 0.4 | 0.4 |
| Irganox ™ 1010 | 0.4 | 0.4 | 0.4 |
| Paraplex ™ G-25 | 2.9 | 2.9 | 2.9 |
| Kemamide ™ E | 0.2 |  |  |
| Kemamide ™ E-221 |  | 0.2 |  |
| Kemamide ™ B |  |  | 0.2 |
| Black Color Concentrate[e] | 1.0 | 1.0 | 1.0 |
| Test Results |  |  |  |
| Flex Modulus, MSI | 2.6 | 2.6 | 2.6 |
| Flex Strength, KSI | 37.5 | 39.0 | 37.7 |
| Tensile Break, KSI | 24.5 | 25.5 | 24.0 |
| % Elongation | 3.4 | 3.7 | 3.6 |

[a]A and C contain primary amide additives (controls).
[b]B contains secondary amide additive.
[c]Polyethylene terephthalate is Traytuf ™ 5900 commercially available from Goodyear.
[d]Glass fiber is 93B commercially available from Certainteed.
[e]Black color concentrate is 21% carbon black in polyethylene terephthalate commercially available from Reed Plastics as CPET 01333.

TABLE 6

Comparison of Primary Amides and Secondary Amides as Gloss Improvers in PET Compositions

|  | D[a] Control | E[b] Invention | F[b] Invention | G[c] Blank |
|---|---|---|---|---|
|  |  | Weight % |  |  |
| Polyethylene Terephthalate[d] | 40.1 | 40.1 | 40.1 | 40.3 |
| Glass[e] | 55.0 | 55.0 | 55.0 | 55.0 |
| Kemamide ™ B | 0.2 |  |  |  |
| Kemamide ™ S-180 |  | 0.2 |  |  |
| Kemamide ™ E-221 |  |  | 0.2 |  |
| Formion ™ 105 | 0.4 | 0.4 | 0.4 | 0.4 |
| Irganox ™ 1010 | 0.4 | 0.4 | 0.4 | 0.4 |
| Paraplex ™ G-25 | 2.9 | 2.9 | 2.9 | 2.9 |
| Black Color Concentrate[f] | 1.0 | 1.0 | 1.0 | 1.0 |
| Test Results |  |  |  |  |
| Flex Modulus, MSI | 2.6 | 2.7 | 2.8 | 2.5 |
| Flex Strength, KSI | 38.2 | 37.5 | 37.7 | 39.3 |
| Tensile Break, KSI | 24.6 | 24.2 | 24.3 | 25.7 |
| % Elongation | 3.6 | 3.6 | 3.4 | 3.7 |

[a]D contains primary amide additives (control).
[b]E and F contain secondary amide addivives.
[c]G contains no gloss improver additive.
[d]Polyethylene terephthalate is Traytuf ™ 5900 commercially available from Goodyear.
[e]Glass fiber is 93B commercially available from Certainteed.
[f]Black color concentrate is 21% carbon black in polyethylene terephthalate commercially available from Reed Plastics as CPET 01333.

TABLE 7

Comparison of Primary Amides and Secondary Amides as Gloss Improvers in PET Compositions

|  | H[a] Control | I[b] Invention | J[a] Control | K[b] Invention | L[b] Invention |
|---|---|---|---|---|---|
|  |  |  | Weight % |  |  |
| Polyethylene Terephthalate[c] | 39.9 | 39.9 | 39.9 | 39.9 | 39.9 |
| Glass[d] | 55.0 | 55.0 | 55.0 | 55.0 | 55.0 |
| Formion ™ 105 | 0.4 | 0.4 | 0.4 | 0.4 | 0.4 |
| Irganox ™ 1010 | 0.4 | 0.4 | 0.4 | 0.4 | 0.4 |
| Paraplex ™ G-25 | 2.9 | 2.9 | 2.9 | 2.9 | 2.9 |
| Kemamide ™ E | 0.4 |  |  |  |  |
| Kemamide ™ E-221 |  | 0.4 |  |  | 0.4 |
| Kemamide ™ B |  |  | 0.4 |  |  |
| Kemamide ™ S-180 |  |  |  | 0.4 |  |
| Black Color Concentrate[e] | 1.0 | 1.0 | 1.0 | 1.0 | 1.0 |
| Test Results |  |  |  |  |  |
| Flex Modulus, MSI | 2.6 | 2.6 | 2.6 | 2.5 | 2.4 |
| Flex Strength, KSI | 32.3 | 38.3 | 31.8 | 37.6 | 38.3 |
| Tensile Break, KSI | 19.3 | 25.4 | 18.2 | 25.6 | 25.2 |
| % Elongation | 2.0 | 2.9 | 1.8 | 3.0 | 3.0 |

[a]H and J contain primary amide additives (controls).
[b]I, K and L contain secondary amide additives.
[c]Polyethylene terephthalate is Traytuf ™ 5900 commercially available from Goodyear.
[d]Glass fiber is 93B commercially available from Certainteed.
[e]Black color concentrate is 21% carbon black in polyethylene terephthalate commercially available from Reed Plastics as CPET 01333.

EXAMPLE 5

This example shows that the secondary amide additives of the present invention can be used as gloss improvers in polyethylene terephthalate molding compositions at levels of 1.0 pphr, 2.0 pphr and 3.0 pphr with no detrimental effect on the mechanical properties of molded articles made from the inventive molding compositions.

Referring to the "Test Results" in Table 8 it can been seen that for a given secondary amide additive the measured mechanical properties of molded articles were comparable at additive levels of 1.0 pphr, 2.0 pphr and 3.0 pphr.

The secondary amide additives used in this example were (1) Kemamide ™ E-221 with a major portion of erucyl erucamide which is N-13-docosenyl 13- docosenamide, (2) Kemamide TM S-180 with a major portion of N-stearyl stearamide which is N-octadecyl octadecanamide and (3) Kemamide TM P-181 with a major portion of N-oleyl palmitamide which is N-9-octadecenyl hexadecanamide.

gloss improvers in polyethylene terephthalate compositions containing 30 weight percent glass fiber and no colorant wherein the E' and F' systems also contained a flame retardant.

Runs C' and D' in Table 9 further show the effective-

TABLE 8

Varying Amounts of Secondary Amides as Gloss Improvers in Polyethylene Terephthalate Compositions

|  | M | N | O | P | Q | R | S | T | U | V |
|---|---|---|---|---|---|---|---|---|---|---|
|  | Invention | | | | Invention | | | Invention | | Blank |
|  | Weight % | | | | | | | | | |
| Polyethylene Terephthalate[d] | 39.9 | 39.9 | 39.9 | 39.5 | 39.5 | 39.5 | 39.1 | 39.1 | 39.1 | 40.3 |
| Glass[e] | 55.0 | 55.0 | 55.0 | 55.0 | 55.0 | 55.0 | 55.0 | 55.0 | 55.0 | 55.0 |
| Formion TM 105 | 0.4 | 0.4 | 0.4 | 0.4 | 0.4 | 0.4 | 0.4 | 0.4 | 0.4 | 0.4 |
| Irganox TM 1010 | 0.4 | 0.4 | 0.4 | 0.4 | 0.4 | 0.4 | 0.4 | 0.4 | 0.4 | 0.4 |
| Paraplex TM G-25 | 2.9 | 2.9 | 2.9 | 2.9 | 2.9 | 2.9 | 2.9 | 2.9 | 2.9 | 2.9 |
| Kemamide TM E-221 | 0.4 | | | 0.8 | | | 1.2 | | | |
| Kemamide TM S-180 | | 0.4 | | | 0.8 | | | 1.2 | | |
| Kemamide TM P-181 | | | 0.4 | | | 0.8 | | | 1.2 | |
| Black Color Concentrate[f] | 1.0 | 1.0 | 1.0 | 1.0 | 1.0 | 1.0 | 1.0 | 1.0 | 1.0 | 1.0 |
| Test Results | | | | | | | | | | |
| Flex Modulus, MSI | 2.7 | 2.6 | 2.6 | 2.6 | 2.5 | 2.6 | 2.6 | 2.5 | 2.5 | 2.7 |
| Flex Strength, KSI | 33.0 | 32.9 | 31.7 | 31.9 | 33.0 | 30.8 | 32.6 | 34.2 | 33.0 | 34.5 |
| Tensile Break, KSI | 21.9 | 21.6 | 20.6 | 21.5 | 21.6 | 19.9 | 20.6 | 21.9 | 21.9 | 22.1 |
| % Elongation | 2.5 | 2.5 | 2.4 | 2.8 | 2.7 | 2.5 | 2.5 | 2.7 | 2.7 | 2.4 |

[d]Polyethylene terephthalate is Traytuf TM 5900 commercially available from Goodyear.
[e]Glass fiber is 93B commercially available from Certainteed.
[f]Black color concentrate is 21% carbon black in polyethylene terephthalate commercially available from Reed Plastics as CPET 01333.

EXAMPLE 6

This example shows that the secondary amide additives of the present invention can be used as gloss improvers in flame retarded polyethylene terephthalate molding compositions in the absence of colorant. Molded articles made from two such compositions exhibited a surface which was tan colored and visually rated as "slightly dull". An analogous pair of inventive compositions without colorant and without flame retardant gave molded articles which exhibited a surface which was off-white and visually rated as "glossy".

Referring to the results in A', B', E' and F' of Table 9 it can be seen that the secondary amides Kemamide TM E-221 and Kemamide TM S-180 functioned as gloss improvers in polyethylene terephthalate compositions containing no colorant and no flame retardant but with a higher level of glass fiber at 45 weight percent. Molded articles from inventive compositions C' and D' exhibited higher flexural strengths than did molded articles made from inventive compositions A' and B'. This difference was probably due to the higher glass loading in the C' and D' systems.

In all the runs of Table 9 the level of secondary amide gloss improvers was 1.0 pphr.

In the flame retarded compositions of Table 9, i.e., E' and F', a dramatic increase in flow properties is evident as is somewhat of a decline in flexural strength and tensile break values.

TABLE 9

Secondary Amides as Gloss Improvers in Flame Retarded Polyethylene Terephthalate Compositions

|  | A' | B' | C' | D' | E' | F' |
|---|---|---|---|---|---|---|
|  | Weight % | | | | | |
| Polyethylene Terephthalate | 63.6 | 63.6 | 50.0 | 50.0 | 49.1 | 49.1 |
| Glass | 30.0 | 30.0 | 45.0 | 45.0 | 30.0 | 30.0 |
| Formion TM 105 | 0.6 | 0.6 | 0.5 | 0.5 | 0.5 | 0.5 |
| Irganox TM 1010 | 0.6 | 0.6 | 0.5 | 0.5 | 0.5 | 0.5 |
| Paraplex TM G-25 | 4.6 | 4.6 | 3.5 | 3.5 | 3.5 | 3.5 |
| Kemamide TM E-221 | 0.6 | | 0.5 | | 0.5 | |
| Kemamide TM S-180 | | 0.6 | | 0.5 | | 0.5 |
| Pyrochek TM 68PB | | | | | 14.4 | 14.4 |
| Sodium Antimonate | | | | | 1.5 | 1.5 |
| Test Results | | | | | | |
| Flex Modulus, MSI | 1.5 | 1.5 | 2.1 | 2.2 | 1.6 | 1.6 |
| Flex Strength, KSI | 36.3 | 36.6 | 41.8 | 43.6 | 28.5 | 28.0 |
| Tensile Break, KSI | 22.4 | 22.9 | 21.8 | 23.0 | 18.9 | 18.1 |
| % Elongation | 5.1 | 5.4 | 3.2 | 3.7 | 4.0 | 3.5 |
| Notched Izod, Ft. Lb./In. | 1.6 | 1.5 | 1.8 | 1.8 | 1.1 | 0.9 |
| Melt Flow, g/10 min., 275°, 5 Kg | 48 | 45 | 38 | 40 | 92 | 92 |
| Spiral Flow, in., at | | | | | | |
| 6,750 psi | 7¾ | 8 | 6¼ | 6¼ | 10¼ | 10¼ |
| 13,500 psi | 11¾ | 11¾ | 9¾ | 9¾ | 15¼ | 15¾ |
| 20,250 psi | 14¼ | 14¼ | 11¾ | 11¾ | 19¼ | 19¾ |
| Color | off white | off white | off white | off white | tan | tan |
| Surface | glossy | glossy | slightly | slightly | slightly | slightly |

TABLE 9-continued

Secondary Amides as Gloss Improvers in Flame
Retarded Polyethylene Terephthalate Compositions

| | A' | B' | C' | D' | E' | F' |
|---|---|---|---|---|---|---|
| | | | | Weight % | | |
| | | | dull | dull | dull | dull |

EXAMPLE 7

This example shows that the secondary amide additives of the present invention can be used as gloss improvers in flame retarded polyethylene terephthalate molding compositions in the presence of a colorant such as carbon black. Molded articles made from two such compositions exhibited a surface which was black and visually rated as "very slightly dull". An analogous pair of inventive compositions without flame retardant but with a carbon black colorant gave molded articles which exhibited a black surface which was visually rated as "very slightly dull".

Referring to the results in G', H', K' and L' of Table 10 it can be seen that the secondary amides Kemamide TM E-221 and Kemamide TM S-180 functioned as gloss improvers in polyethylene terephthalate compositions containing 30 weight percent glass fiber and carbon black colorant wherein the K' and L' systems also contained a flame retardant.

Runs I' and J' in Table 10 further show the effectiveness of the secondary amides as gloss improvers in polyethylene terephthalate compositions containing carbon black colorant and no flame retardant but with a higher level of glass fiber at 45 weight percent. Molded articles from inventive compositions I' and J' exhibited higher flexural strengths than did molded articles made from inventive compositions G' and H'. This difference was probably due to the higher glass loading in the I' and J' systems.

In all the runs of Table 10 the level of secondary amide gloss improvers was 1.0 pphr.

In the flame retarded compositions of Table 10, i.e., K' and L', a rather dramatic increase in flow properties is evident as is somewhat of a decline in flexural strength and tensile break values.

TABLE 10

Secondary Amides as Gloss Improvers in Flame
Retarded Polyethylene Terephthalate Compositions
with Carbon Black

| | G' | H' | I' | J' | K' | L' |
|---|---|---|---|---|---|---|
| | | | Weight % | | | |
| Polyethylene Terephthalate | 62.6 | 62.6 | 49.0 | 49.0 | 48.1 | 48.1 |
| Glass | 30.0 | 30.0 | 45.0 | 45.0 | 30.0 | 30.0 |
| Formion TM 105 | 0.6 | 0.6 | 0.5 | 0.5 | 0.5 | 0.5 |
| Irganox TM 1010 | 0.6 | 0.6 | 0.5 | 0.5 | 0.5 | 0.5 |
| Paraplex TM G-25 | 4.6 | 4.6 | 3.5 | 3.5 | 3.5 | 3.5 |
| Kemamide TM E-221 | 0.6 | | 0.5 | | 0.5 | |
| Kemamide TM S-180 | | 0.6 | | 0.5 | | 0.5 |
| Pyrochek TM 68PB | | | | | 14.4 | 14.4 |
| Sodium Antimonate | | | | | 1.5 | 1.5 |
| Black Color Concentrate | 1.0 | 1.0 | 1.0 | 1.0 | 1.0 | 1.0 |
| Test Results | | | | | | |
| Flex Modulus, MSI | 1.5 | 1.4 | 2.1 | 2.1 | 1.6 | 1.5 |
| Flex Strength, KSI | 33.7 | 33.6 | 39.1 | 39.2 | 28.3 | 27.9 |
| Tensile Break, KSI | 21.8 | 21.4 | 22.6 | 23.1 | 18.9 | 19.0 |
| % Elongation | 5.0 | 4.9 | 3.6 | 3.9 | 4.0 | 3.8 |
| Notched Izod, Ft. Lb./In. | 1.2 | 1.3 | 1.6 | 1.6 | 1.1 | 1.0 |
| Melt Flow, g/min., 275° C., 5 Kg | 50 | 53 | 36 | 36 | 89 | 90 |
| Color | black | black | black | black | black | black |
| Surface | very slightly dull | very slightly dull | slightly dull | slightly dull | very slightly dull | very slightly dull |

That which is claimed is:
1. A composition comprising:
   (a) about 30 to about 90 weight percent, based on the total weight of the composition polyethylene terephthalate;
   (b) about 5 to about 65 weight percent based on the total weight of the composition filler;
   (c) about 0.5 to 15 parts per hundred parts of (a) a normally liquid aliphatic polyester having a number average molecular weight in the range from about 7,500 to about 20,000 and which is a condensation product of an alkanedioic acid containing from 8 to about 12 carbon atoms per molecule and an alkanediol containing from 2 to about 5 carbon atoms per molecule;
   (d) about 0.1 to about 3 parts per hundred parts of (a) a metal salt of an ionic hydrocarbon copolymer of an alpha-olefin containing from 2 to about 5 carbon atoms per molecule and an alpha,beta-ethylenically unsaturated carboxylic acid containing from 3 to about 5 carbon atoms per molecule in which copolymer the neutralized anionic carboxyl groups are associated with cations of said metal, said copolymer having a number average molecular weight in excess of about 3,000 prior to neutralization, said metal being selected from the group consisting of sodium and potassium;
   (e) about 0.01 to 2 parts per hundred parts of (a) an antioxidant;
   (f) about 0.1 to about 5 parts per hundred parts of (a) a secondary amide described by the formula:

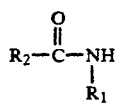

wherein R₁ and R₂ may be the same or different and represent alkyl groups or unsaturated aliphatic groups containing from 8 to 36 carbon atoms, and wherein each said unsaturated group can have up to three double bonds.

2. A composition according to claim 1 wherein:
said polyethylene terephthalate is present in an amount within the range of about 35 to about 65 weight percent, based on total weight of the composition;
said filler includes glass fibers, said glass fibers being present in an amount within the range of about 0 to about 60 weight percent, based on total weight of the composition;
said aliphatic polyester is present in an amount within the range of about 2.5 to about 10 pph resin;
said metal salt is present in an amount within the range of about 0.2 to about 1.2 pph resin;
said antioxidant is present in an amount within the range of about 0.2 to about 1.0 pph resin; and
said secondary amide is present in an amount of about 0.5 to about 3 pph resin.

3. A composition as recited in claim 2 which additionally contains from greater than 0 to about 50 pph resin of a flame retardant.

4. A composition as recited in claim 3 wherein said flame retardant consists essentially of:
(i) brominated polystyrene having a molecular weight ranging from about 10,000 to about 400,000 and having a bromine content in the range of from about 55 to about 75 weight percent based on the total weight of said brominated polystyrene; and
(ii) an antimonate of at least one metal selected from Groups I, II or VII of the Periodic Table, the weight ratio of said brominated polystyrene to said antimonate being in the range from about 2:1 to 12:1.

5. A composition as recited in claim 4 wherein said antimonate is selected from the group consisting of sodium antimonate, zinc antimonate, and nickel antimonate.

6. A composition as recited in claim 5 wherein said antimonate comprises sodium antimonate.

7. A composition as recited in claim 2 which additionally contains from greater than 0 to about 10 weight percent based on total weight of the composition of a colorant.

8. A composition as recited in claim 2 wherein said aliphatic polyester has a molecular weight in the range from about 8,000 to about 10,000 and comprises a condensation product of sebacic acid and 1,2-propanediol.

9. A composition as recited in claim 2 wherein said ionic hydrocarbon copolymer is a copolymer of ethylene and an alpha,beta-ethylenically unsaturated carboxylic acid selected from the group consisting of acrylic acid, methacrylic acid, and mixtures thereof.

10. A composition as recited in claim 2 wherein said antioxidant is a hindered phenol.

11. A composition as recited in claim 7 wherein said colorant is carbon black.

12. A composition as recited in claim 3 wherein said aliphatic polyester has a molecular weight in the range from about 8,000 to about 10,000 and comprises a condensation product of sebacic acid and 1,2-propanediol.

13. A composition as recited in claim 3 wherein said ionic hydrocarbon copolymer is a copolymer of ethylene and an alpha,beta-ethylenically unsaturated carboxylic acid selected from the group consisting of acrylic acid, methacrylic acid, and mixtures thereof.

14. A composition as recited in claim 3 wherein said antioxidant is a hindered phenol.

15. A composition as recited in claim 3 which additionally contains from greater than 0 to about 10 weight percent based on total weight of the composition of a colorant.

16. A composition as recited in claim 15 wherein said colorant is carbon black.

17. A composition according to claim 1 wherein said filler comprises a mixture of mica and fiber glass.

18. A composition according to claim 1 wherein:
said polyethylene terephthalate is present in an amount within the range of about 30 to about 90 weight percent based on total weight of the composition;
said filler is present in an amount within the range of about 5 to about 65 weight percent, based on total weight of the composition, said filler comprising a mixture of mica and fiber glass having a ratio of said mica to said fiber glass from about 10:1 to about 1:10;
said aliphatic polyester is present in an amount within the range of about 0.5 to about 15 pph resin;
said metal salt is present in an amount within the range of about 0.1 to about 3 pph resin;
said antioxidant is present in an amount within the range of about 0.01 to about 2 pph resin; and
said secondary amide is present in an amount within the range of about 0.1 to about 5 pph resin.

19. A composition as recited in claim 18 which additionally contains from greater than 0 to about 50 pph resin of a flame retardant.

20. A composition as recited in claim 19 wherein said flame retardant consists essentially of:
(i) brominated polystyrene having a molecular weight ranging from about 10,000 to about 400,000 and having a bromine content in the range of from about 55 to about 75 weight percent based on the total weight of said brominated polystyrene; and
(ii) an antimonate of at least one metal selected from Groups I, II or VII of the Periodic Table, the weight ratio of said brominated polystyrene to said antimonate being in the range from about 1:1 to 20:1.

21. A composition as recited in claim 18 wherein said aliphatic polyester has a molecular weight in the range from about 8,000 to about 10,000 and comprises a condensation product of sebacic acid and 1,2-propanediol.

22. A composition as recited in claim 18 wherein said ionic hydrocarbon copolymer is a copolymer of ethylene and an alpha,beta-ethylenically unsaturated carboxylic acid selected from the group consisting of acrylic acid, methacrylic acid, and mixtures thereof.

23. A composition as recited in claim 18 wherein said antioxidant is a hindered phenol.

24. A composition as recited in claim 19 wherein said aliphatic polyester has a molecular weight in the range from about 8,000 to about 10,000 and comprises a condensation product of sebacic acid and 1,2-propanediol.

25. A composition as recited in claim 19 wherein said ionic hydrocarbon copolymer is a copolymer of ethylene and an alpha,beta-ethylenically unsaturated carboxylic acid selected from the group consisting of acrylic acid, methacrylic acid, and mixtures thereof.

26. A composition as recited in claim 19 wherein said antioxidant is a hindered phenol.

27. A composition as recited in claim 18 which additionally contains from greater than 0 to about 10 weight percent based on total weight of the composition of a colorant.

28. A composition as recited in claim 19 which additionally contains from greater than 0 to about 10 weight percent based on total weight of the composition of a colorant.

29. A composition as recited in claim 27 wherein said colorant is carbon black.

30. A composition as recited in claim 28 wherein said colorant is carbon black.

31. A process for preparing a composition comprising:
(a) about 30 to about 90 weight percent, based on the total weight of the composition polyethylene terephthalate;
(b) about 5 to about 65 weight percent based on the total weight of the composition filler;
(c) about 0.5 to 15 parts per hundred parts of (a) a normally liquid aliphatic polyester having a number average molecular weight in the range from about 7,500 to about 20,000 and which is a condensation product of an alkanedioic acid containing from 8 to about 12 carbon atoms per molecule and an alkanediol containing from 2 to about 5 carbon atoms per molecule;
(d) about 0.1 to about 3 parts per hundred parts of (a) a metal salt of an ionic hydrocarbon copolymer of an alpha-olefin containing from 2 to about 5 carbon atoms per molecule and an alpha,beta-ethylenically unsaturated carboxylic acid containing from 3 to about 5 carbon atoms per molecule in which copolymer the carboxyl groups are associated with cations of said metal, said copolymer having a number average molecular weight in excess of about 3,000 prior to neutralization, said metal being selected from the group consisting of sodium and potassium;
(e) about 0.01 to 2 parts per hundred parts of (a) an antioxidant;
(f) about 0.1 to about 5 parts per hundred parts of (a) a secondary amide described by the formula:

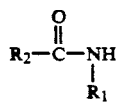

wherein $R_1$ and $R_2$ may be the same or different and represent alkyl groups or unsaturated aliphatic groups containing from 8 to 36 carbon atoms, and wherein each said unsaturated group can have up to three double bonds;
said process comprising mixing components (a) through (f) and melt extruding the mixture.

32. A process in accordance with claim 31 wherein:
said polyethylene terephthalate is present in an amount within the range of about 35 to about 65 weight percent based on total weight of the composition;
said filler comprises glass fibers, said glass fibers being present in an amount within the range of about 0 to about 60 weight percent, based on total weight of the composition;
said aliphatic polyester is present in an amount within the range of about 2.5 to about 10 pph resin;
said metal salt is present in an amount within the range of about 0.2 to about 1.2 pph resin;
said antioxidant is present in an amount within the range of about 0.2 to about 1.0 pph resin; and
said secondary amide is present in an amount within the range of about 0.5 to about 3 pph resin.

33. A process as recited in claim 32 wherein said polyethylene terephthalate is premixed with said glass fibers before the resulting mixture is admixed with the remaining components.

34. A process in accordance with claim 31 wherein said composition further comprises:
(g) a flame retardant.

35. A process according to claim 31 wherein:
said polyethylene terephthalate is present in an amount within the range of about 30 to about 90 weight percent based on total weight of the composition;
said filler comprises glass fibers, said glass fibers being present in an amount within the range of about 5 to about 65 weight percent based on total weight of the composition;
said aliphatic polyester is present in an amount within the range of about 0.5 to about 15 pph resin;
said metal salt is present in an amount within the range of about 0.1 to about 3 pph resin;
said antioxidant is present in an amount within the range of about 0.01 to about 2 pph resin;
said secondary amide is present in an amount within the range of about 0.1 to about 5 pph resin; and
wherein said composition comprises in addition:
(g) from greater than 0 to about 50 pph resin of a flame retardant.

36. A process as recited in claim 35 wherein said polyethylene terephthalate is premixed with said glass fibers before the resulting mixture is admixed with the remaining components.

37. A process according to claim 31 wherein said composition comprises in addition:
(g) a flame retardant; and
(h) a colorant.

38. A process according to claim 31 wherein:
said polyethylene terephthalate is present in an amount within the range of about 30 to about 90 weight percent based on total weight of the composition;
said filler comprises glass fibers, said glass fibers being present in an amount within the range of about 5 to about 65 weight percent, based on total weight of the composition;
said aliphatic polyester is present in an amount within the range of about 0.5 to about 15 pph resin;
said metal salt is present in an amount within the range of about 0.1 to about 3 pph resin;
said antioxidant is present in an amount within the range of about 0.01 to about 2 pph resin;
said secondary amide is present in an amount within the range of about 0.1 to about 5 pph resin; and
wherein said composition comprises in addition:

(g) from greater than 0 to about 50 pph resin of a flame retardant; and (h) from greater than 0 to about 10 weight percent, based on total weight of the composition, of a colorant.

39. A process according to claim 31 wherein said filler comprises a mixture of mica and fiber glass.

40. A process in accordance to claim 31 wherein:
said polyethylene terephthalate is present in an amount within the range of about 30 to about 90 weight percent, based on total weight of the composition;
said filler is present in an amount within the range of about 5 to about 65 weight percent, based on total weight of the composition, said filler comprises a mixture of mica and fiber glass having a ratio of said mica to said fiber glass from about 10:1 to about 1:10;
said aliphatic polyester is present in an amount within the range of about 0.5 to about 15 pph resin;
said metal salt is present in an amount within the range of about 0.1 to about 3 pph resin;
said antioxidant is present in an amount within the range of about 0.01 to about 2 pph resin; and
said secondary amide is present in an amount within the range of about 0.1 to about 5 pph resin.

41. A process according to claim 31 wherein:
said filler comprises a mixture of mica and fiber glass; and
wherein said composition comprises in addition:
(g) a flame retardant.

42. A process in accordance with claim 31 wherein:
said polyethylene terephthalate is present in an amount within the range of about 30 to about 90 weight percent, based on total weight of the composition;
said filler is present in an amount within the range of about 5 to about 65 weight percent, based on total weight of the composition, said filler comprising a mixture of mica and fiber glass having a ratio of said mica to said fiber glass from about 10:1 to about 1:10;
said aliphatic polyester is present in an amount within the range of about 0.5 to about 15 pph resin;
said metal salt is present in an amount within the range of about 0.1 to about 3 pph resin;
said antioxidant is present in an amount within the range of about 0.01 to about 2 pph resin;
said secondary amide is present in an amount within the range of about 0.1 to about 5 pph resin; and
wherein said composition further comprises:
(g) from greater than 0 to about 50 pph resin of a flame retardant.

43. A process according to claim 31 wherein said composition further comprises:
(g) a colorant.

44. A process according to claim 31 wherein:
said polyethylene terephthalate is present in an amount within the range of about 30 to about 90 weight percent, based on total composition;
said filler is present in an amount within the range of about 5 to about 65 weight percent, based on total weight of the composition, said filler comprising a mixture of mica and fiber glass having a ratio of said mica to said fiber glass from about 10:1 to about 1:10;
said aliphatic polyester is present in an amount within the range of about 0.5 to about 15 pph resin;
said metal salt is present in an amount within the range of about 0.1 to about 3 pph resin;
said antioxidant is present in an amount within the range of about 0.01 to about 2 pph resin;
said secondary amide is present in an amount within the range of about 0.1 to about 5 pph resin; and
wherein said composition comprises in addition:
(g) from greater than 0 to about 10 weight percent, based on total weight of the composition, of a colorant.

45. A process according to claim 31 wherein:
said filler comprises a mixture of mica and fiber glass; and
wherein said composition comprises in addition:
(g) a flame retardant; and
(h) a colorant.

46. A process according to claim 31 wherein:
said polyethylene terephthalate is present in an amount within the range of about 30 to about 90 weight percent, based on total weight of the composition;
said filler is present in an amount within the range of about 5 to about 65 weight percent, based on total weight of the composition, said filler comprising a mixture of mica and fiber glass having a ratio of said mica to said fiber glass from about 10:1 to about 1:10;
said aliphatic polyester is present in an amount within the range of about 0.5 to about 15 pph resin;
said metal salt is present in an amount within the range of about 0.1 to about 3 pph resin;
said antioxidant is present in an amount within the range of about 0.01 to about 2 pph resin;
said secondary amide is present in an amount within the range of about 0.1 to about 5 pph resin;
said composition comprising in addition:
(g) from greater than 0 to about 50 pph resin of a flame retardant; and
(h) from greater than 0 to about 10 weight percent, based on total weight of the composition, of a colorant.

47. A process for making a molded article which comprises injecting into a mold a composition comprising:
(a) about 30 to about 90 weight percent, based on the total weight of the composition polyethylene terephthalate;
(b) about 5 to about 65 weight percent based on the total weight of the composition filler;
(c) about 0.5 to 15 parts per hundred parts of (a) a normally liquid aliphatic polyester having a number average molecular weight in the range from about 7,500 to about 20,000 and which is a condensation product of an alkanedioic acid containing from 8 to about 12 carbon atoms per molecule and an alkanediol containing from 2 to about 5 carbon atoms per molecule;
(d) about 0.1 to about 3 parts per hundred parts of (a) a metal salt of an ionic hydrocarbon copolymer of an alpha-olefin containing from 2 to about 5 carbon atoms per molecule and an alpha,beta-ethylenically unsaturated carboxylic acid containing from 3 to about 5 carbon atoms per molecule in which copolymer the neutralized anionic carboxyl groups are associated with cations of said metal, said copolymer having a number average molecular weight in excess of about 3,000 prior to neutralization, said metal being selected from the group consisting of sodium and potassium;

(e) about 0.01 to 2 parts per hundred parts of (a) an antioxidant;

(f) about 0.1 to about 5 parts per hundred parts of (a) a secondary amide described by the formula:

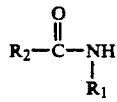

wherein $R_1$ and $R_2$ may be the same or different and represent alkyl groups or unsaturated aliphatic groups containing from 8 to 36 carbon atoms, and wherein each said unsaturated group can have up to three double bonds.

48. A process according to claim 47 wherein:
said polyethylene terephthalate is present in an amount within the range of about 35 to about 65 weight percent based on total weight of the composition;
said filler comprises glass fibers, said glass fibers being present in an amount within the range of about 0 to about 60 weight percent, based on total weight of the composition;
said aliphatic polyester is present in an amount within the range of about 2.5 to about 10 pph resin;
said metal salt is present in an amount within the range of about 0.2 to about 1.2 pph resin;
said antioxidant is present in an amount within the range of about 0.2 to about 1.0 pph resin; and
said secondary amide is present in an amount within the range of about 0.5 to about 3 pph resin.

49. A process in accordance with claim 47 wherein said composition further comprises:
(g) a flame retardant.

50. A process according to claim 47 wherein:
said polyethylene terephthalate is present in an amount within the range of about 30 to about 90 weight percent based on total weight of the composition;
said filler comprises glass fibers, said glass fibers being present in an amount within the range of about 5 to about 65 weight percent based on total weight of the composition;
said aliphatic polyester is present in an amount within the range of about 0.5 to about 15 pph resin;
said metal salt is present in an amount within the range of about 0.1 to about 3 pph resin;
said antioxidant is present in an amount within the range of about 0.01 to about 2 pph resin;
said secondary amide is present in an amount within the range of about 0.1 to about 5 pph resin; and
wherein said composition comprises in addition:
(g) from greater than 0 to about 50 pph resin of a flame retardant.

51. A process according to claim 47 wherein said composition comprises in addition:
(g) a colorant.

52. A process in accordance with claim 47 wherein:
said polyethylene terephthalate is present in an amount within the range of about 30 to about 90 weight percent, based on total weight of the composition;
said filler comprises glass fibers, said glass fibers being present in an amount within the range of about 5 to about 65 weight percent, based on total weight of the composition;
said aliphatic polyester is present in an amount within the range of about 0.5 to about 15 pph resin;
said metal salt is present in an amount within the range of about 0.1 to about 3 pph resin;
said antioxidant is present in an amount within the range of about 0.01 to about 2 pph resin;
said secondary amide is present in an amount within the range of about 0.1 to about 5 pph resin; and
wherein said composition comprises in addition:
(g) from greater than 0 to about 10 weight percent, based on total weight of the composition, of a colorant.

53. A process according to claim 47 wherein said composition comprises in addition:
(g) a flame retardant; and
(h) a colorant.

54. A process according to claim 47 wherein:
said polyethylene terephthalate is present in an amount within the range of about 30 to about 90 weight percent based on total weight of the composition;
said filler comprises glass fibers, said glass fibers being present in an amount within the range of about 5 to about 65 weight percent based on total weight of the composition;
said aliphatic polyester is present in an amount within the range of about 0.5 to about 15 pph resin;
said metal salt is present in an amount within the range of about 0.1 to about 3 pph resin;
said antioxidant is present in an amount within the range of about 0.01 to about 2 pph resin;
said secondary amide is present in an amount within the range of about 0.1 to about 5 pph resin; and
wherein said composition comprises in addition:
(g) from greater than 0 to about 50 pph resin of a flame retardant; and
(h) from greater than 0 to about 10 weight percent, based on total weight of the composition, of a colorant.

55. A process according to claim 47 wherein:
said polyethylene terephthalate is present in an amount within the range of about 30 to about 90 weight percent, based on total weight of the composition; and
said filler comprises a mixture of mica and fiber glass.

56. A process according to claim 47 wherein:
said polyethylene terephthalate is present in an amount within the range of about 30 to about 90 weight percent, based on total weight of the composition;
said filler is present in an amount within the range of about 5 to about 65 weight percent, based on total weight of the composition, said filler comprising a mixture of mica and fiber glass having a ratio of said mica to said fiber glass from about 10:1 to about 1:10;
said aliphatic polyester is present in an amount within the range of about 0.5 to about 15 pph resin;
said metal salt is present in an amount within the range of about 0.1 to about 3 pph resin;
said antioxidant is present in an amount within the range of about 0.01 to about 2 pph resin; and
said secondary amide is present in an amount within the range of about 0.1 to about 5 pph resin.

57. A process according to claim 47 wherein said composition comprises in addition:

(g) a flame retardant.

58. A process according to claim 47 wherein:

said polyethylene terephthalate is present in an amount within the range of about 30 to about 90 weight percent, based on total weight of the composition;

said filler is present in an amount within the range of about 5 to about 65 weight percent, based on total weight of the composition; said filler comprises a mixture of mica and fiber glass having a ratio of said mica to said fiber glass from about 10:1 to about 1:10;

said aliphatic polyester is present in an amount within the range of about 0.5 to about 15 pph resin;

said metal salt is present in an amount within the range of about 0.1 to about 3 pph resin;

said antioxidant is present in an amount within the range of about 0.01 to about 2 pph resin;

said secondary amide is present in an amount within the range of about 0.1 to about 5 pph resin; and wherein said composition further comprises:

(g) from greater than 0 to about 50 pph resin of a flame retardant.

59. A process according to claim 47 wherein:

said polyethylene terephthalate is present in an amount within the range of about 30 to about 90 weight percent, based on total weight of the composition;

said filler comprises a mixture of mica and fiber glass; and wherein said composition comprises in addition:

(g) a colorant.

60. A process according to claim 47 wherein:

said polyethylene terephthalate is present in an amount within the range of about 30 to about 90 weight percent, based on total weight of the composition;

said filler is present in an amount within the range of about 5 to about 65 weight percent, based on total weight of the composition, said filler comprising a mixture of mica and fiber glass having a ratio of said mica to said fiber glass from about 10:1 to about 1:10;

said aliphatic polyester is present in an amount within the range of about 0.5 to about 15 pph resin;

said metal salt is present in an amount within the range of about 0.1 to about 3 pph resin;

said antioxidant is present in an amount within the range of about 0.01 to about 2 pph resin;

said secondary amide is present in an amount within the range of about 0.1 to about 5 pph resin; and wherein said composition comprises in addition:

(g) from greater than 0 to about 10 weight percent, based on total weight of the composition, of a colorant.

61. A process according to claim 47 wherein:

said filler comprises a mixture of mica and fiber glass; and wherein said composition comprises in addition:

(g) a flame retardant; and (h) a colorant.

62. A process according to claim 47 wherein:

said polyethylene terephthalate is present in an amount within the range of about 30 to about 90 weight percent, based on total weight of the composition;

said filler is present in an amount within the range of about 5 to about 65 weight percent, based on total weight of the composition, said filler comprising a mixture of mica and fiber glass having a ratio of said mica to said fiber glass from about 10:1 to about 1:10;

said aliphatic polyester is present in an amount within the range of about 0.5 to about 15 pph resin;

said metal salt is present in an amount within the range of about 0.1 to about 3 pph resin;

said antioxidant is present in an amount within the range of about 0.01 to about 2 pph resin;

said secondary amide is present in an amount within the range of about 0.1 to about 5 pph resin; and wherein said composition comprises in addition:

(g) from greater than 0 to about 50 pph resin of a flame retardant; and (h) from greater than 0 to about 10 weight percent, based on total weight of the composition, of a colorant.

63. A molded article produced by the process of claim 47.

64. A molded article produced by the process of claim 49.

65. A molded article produced by the process of claim 51.

66. A molded article produced by the process of claim 53.

67. A molded article produced by the process of claim 55.

68. A molded article produced by the process of claim 57.

69. A molded article produced by the process of claim 59.

70. A molded article produced by the process of claim 61.

* * * * *

UNITED STATES PATENT AND TRADEMARK OFFICE
CERTIFICATE OF CORRECTION

PATENT NO. : 5,068,274

DATED : 11-26-91

INVENTOR(S) : Howard F. Efner et al

It is certified that error appears in the above-identified patent and that said Letters Patent is hereby corrected as shown below:

ON THE TITLE PAGE

At [75] on the first page, please add the following inventor:

Donald E. Allen, Bartlesville, Okla.

Column 4, the heading above the last paragraph should read --- Fillers --- instead of "Filler".

Column 6, line 32, please delete the period after the letter "C".

Column 7, line 19, the full-size on-line "TM" should be a superscript on the word "Kemamide".

Column 7, line 20, the full-size on-line "TM" printed as an abbreviation, should be printed as a superscript on the word Kemamide, both occurrences.

Column 8, line 68, please delete the period after the "F".

UNITED STATES PATENT AND TRADEMARK OFFICE
CERTIFICATE OF CORRECTION

PATENT NO. : 5,068,274

DATED : 11-26-91

INVENTOR(S) : Howard F. Efner et al

It is certified that error appears in the above-identified patent and that said Letters Patent is hereby corrected as shown below:

Column 9, line 18, please delete the period after the "F".

Column 9, line 21, please delete the period after the "F".

Column 9, line 36, please delete the period after the "F", first occurrence.

Column 10, line 20, the "TM" should be printed as a superscript on the word "Formion".

Column 10, line 21, the "TM" should be printed as a superscript on the word "Irganox".

Column 10, line 22, the "TM" should be printed as a superscript on the word "Paraplex".

Column 10, line 23, the "TM" should be printed as a superscript on the word "Kemamide".

UNITED STATES PATENT AND TRADEMARK OFFICE
CERTIFICATE OF CORRECTION

PATENT NO. : 5,068,274

DATED : 11-26-91

INVENTOR(S) : Howard F. Efner et al

It is certified that error appears in the above-identified patent and that said Letters Patent is hereby corrected as shown below:

Column 10, line 24, the "TM" should be printed as a superscript on the word "Kemamide".

Column 10, line 25, the "TM" should be printed as a superscript on the word "Traytuf".

Column 10, line 65, the "Weight %" should be printed below the underscore across the top of the column rather than above the underscore since this refers only to the numbers in the first section of the table rather than to all numbers below the underscore.

Column 11, line 7, the "Weight %" should be printed below the underscore rather than above the underscore.

Column 11, line 15, the line starting with "g/10 min." should be indented three spaces.

Column 11, line 15, the underscore under "DSC Measurements, °C" should be deleted.

Column 11, line 16, "Tg" should be indented three spaces.

Column 11, line 17, "Tcc" should be indented three spaces.

Column 11, line 18, "Tm" should be indented three spaces.

UNITED STATES PATENT AND TRADEMARK OFFICE
CERTIFICATE OF CORRECTION

PATENT NO. : 5,068,274

DATED : 11-26-91

INVENTOR(S) : Howard F. Efner et al

It is certified that error appears in the above-identified patent and that said Letters Patent is hereby corrected as shown below:

Column 11, line 19, "Tmc" should be indented three spaces.

Column 11, line 28, the underscore under "Izod Impact" should be deleted.

Column 11, line 29, the line beginning "Notched" should be indented three spaces.

Column 11, line 30, the heading beginning "Unnotched" should be indented three spaces.

Column 11, line 33, the "TM" should be printed as a superscript on the word "Traytuf".

Column 12, line 7, "wt %" should be indented three spaces.

Column 10, line 10, "TM" should be printed as a superscript on the word "Formion".

Column 12, line 11, "TM" should be printed as a superscript on the word "Irganox".

UNITED STATES PATENT AND TRADEMARK OFFICE
CERTIFICATE OF CORRECTION

PATENT NO. : 5,068,274
DATED : 11-26-91
INVENTOR(S) : Howard F. Efner et al

It is certified that error appears in the above-identified patent and that said Letters Patent is hereby corrected as shown below:

Column 12, line 12, "TM" should be printed as a superscript on the word "papaplex".

Column 12, line 13, "TM" should be printed as a superscript on the word "Kemamide".

Column 12, line 14, "TM" should be printed as a superscript on the word "Kemamide".

Column 12, line 27, the underscore under "Spiral Flow, In at" should be deleted.

Column 12, line 28, "6,750 PSI" should be indented three spaces.

Column 12, line 29, "13,500 PSI" should be indented three spaces.

Column 12, line 30, "20,250 PSI" should be indented three spaces.

Column 12, line 32, "% Tensile at" should be in indented three spaces.

Column 12, line 32, the underscore under "% Tensile at" should be deleted.

Column 12, line 37, "TM" should be printed as a superscript on the word "Traytuf".

UNITED STATES PATENT AND TRADEMARK OFFICE
CERTIFICATE OF CORRECTION

PATENT NO. : 5,068,274

DATED : 11-26-91

INVENTOR(S) : Howard F. Efner et al

It is certified that error appears in the above-identified patent and that said Letters Patent is hereby corrected as shown below:

Column 13, line 4, "Kemamide" is improperly hyphenated.

Column 13, line 5, the full-size on-line "TM" should be printed as a superscript on the word "Kemamide, both occurrences.

Column 13, line 20, "Weight %" should be printed below the underscore.

Column 13, line 23, "TM" should be printed as a superscript on the word "Formion".

Column 13, line 24, "TM" should be printed as a superscript on the word "Papaplex".

Column 13, line 25, "TM" should be printed as a superscript on the words "Kemamide".

Column 13, line 26, "TM" should be printed as a superscript on the word "Kemamide".

Column 13, lines 15 through 68, Table 5 not be broken.

UNITED STATES PATENT AND TRADEMARK OFFICE
CERTIFICATE OF CORRECTION

PATENT NO. : 5,068,274

DATED : 11-26-91

INVENTOR(S) : Howard F. Efner et al

It is certified that error appears in the above-identified patent and that said Letters Patent is hereby corrected as shown below:

Column 13, line 64, "TM" should be printed as a superscript on the word "Traytuf".

Column 14, line 6, the line across the top of the columns should be printed under the words of the headings "Control", "Invention", "Invention" and "Blank" rather than under the subheading "Weight %".

Column 14, line 7, the line underneath the heading "Weight %" should only extend over the columns which have numbers.

Column 14, line 9, "TM" should be printed as a superscript on the word "Kemamide".

Column 14, line 11, "TM" should be printed as a superscript on the word "Kemamide".

Column 14, line 12, "TM" should be printed as a superscript on the word "Kemamide".

Column 14, line 13, "TM" should be printed as a superscript on the word "Formion".

Column 14, line 15, "TM" should be printed as a superscript on the word "Irganox".

Column 14, line 16, "TM" should be printed as a superscript on the word "Paraplex".

UNITED STATES PATENT AND TRADEMARK OFFICE
CERTIFICATE OF CORRECTION

PATENT NO. : 5,068,274
DATED : 11-26-91
INVENTOR(S) : Howard F. Efner et al It is certified that error appears in the above-identified patent and that said Letters Patent is hereby corrected as shown below:

Column 14, line 23, "TM" should be printed as a superscript on the word "Traytuf".

Column 14, line 33, the heading line across the tops of the columns should be under the headings, "Control", "Invention", "Control", "Invention", and "Invention" and extend the width of the table.

Column 14, line 35, please delete the line extending across the heads of the columns below the words "Weight %" and underline only the heading "Weight %".

Column 14, Table 7, each of the "TM"s, eight occurrences in the first column and footnote should be printed as superscripts.

Column 14, line 67, "TM" should be printed as a superscript on the word "Kemamide".

Column 15, line 1, "TM" should be printed as a superscript on the word "Kemamide".

Column 15, line 3, "TM" should be printed as a superscript on the word "Kemamide".

UNITED STATES PATENT AND TRADEMARK OFFICE
CERTIFICATE OF CORRECTION

PATENT NO. : 5,068,274

DATED : 11-26-91

INVENTOR(S) : Howard F. Efner et al

It is certified that error appears in the above-identified patent and that said Letters Patent is hereby corrected as shown below:

Column 15, Table 8, a column heading line should extend the entire width of the table immediately underneath the headings "Invention" "Invention", "Invention" and "Blank".

Column 15, Table 8, please insert a line the width of the table underneath the headings "Invention", "Invention", "Invention" and "Blank".

Column 15, Table 8, the heading line immediately underneath "Weight %" should underline only the subheading "Weight %".

Column 15, Table 8, "TM" should be printed as a superscript in each of the seven occurrences in column 1 and footnote d.

Column 15, line 41, "Kemamide" is improperly hyphenated.

Column 15, line 43, "TM" should be printed as a superscript on the word "Kemamide", both occurrences.

Column 16, Table 9, please add an underscore the width of the table immediately under the column headings "A'", "B'", "C'", "D'", "E'" and "F'".

Column 16, Table 9, please delete the underscore the width of the table underneath "Weight %" and substitute therefor an underscore under just the subheading "Weight %".

UNITED STATES PATENT AND TRADEMARK OFFICE
CERTIFICATE OF CORRECTION

PATENT NO. : 5,068,274
DATED : 11-26-91
INVENTOR(S) : Howard F. Efner et al

It is certified that error appears in the above-identified patent and that said Letters Patent is hereby corrected as shown below:

Column 16, Table 9, "TM" should be printed as a superscript, six occurrences.

Column 16, Table 9, "g/10 min., 275°, 5 Kg" should be indented three spaces.

Column 16, Table 9, the underscore under "Spiral Flow, in., at" should be deleted.

Column 16, Table 9, "6,750 psi" should be indented three spaces.

Column 16, Table 9, "13,500 psi" should be indented three spaces.

Column 16, Table 9, "20,250 psi" should be indented three spaces.

Column 16, Table 9, the table should not be broken so as to separate two-hyphen word entries referring to the word "Surface". Please make the break above the row beginning "Surface".

Column 17, Table 9, please add an underscore the width of the table immediately under the headings "A'", "B'", "C'", "D'", "E'" and "F'".

Column 17, Table 9, please delete the subheading "Weight %" and the underscore the width of the table under it because this refers only

UNITED STATES PATENT AND TRADEMARK OFFICE
CERTIFICATE OF CORRECTION

PATENT NO. : 5,068,274

DATED : 11-26-91

INVENTOR(S) : Howard F. Efner et al

It is certified that error appears in the above-identified patent and that said Letters Patent is hereby corrected as shown below:

to the first subsection within the table not to anything in this last section of the table.

Column 17, line 49, "Kemamide" is improperly hyphenated.

Column 17, line 50, "TM" should be printed as a superscript on the word "Kemamide", two occurrences.

Column 17, immediately below Table 9. Please move the heading "EXAMPLE 7" so that it is immediately above the copy to which is refers.

Column 18, Table 10, please add an underscore the width of the table immediately below the headings "G'", "H'", "I'", "J'" and "K'".

Column 18, Table 10, please delete the table-width underscore under the sub-heading "Weight %".

Column 18, Table 10, "TM" should be printed as a superscript, six occurrences.

UNITED STATES PATENT AND TRADEMARK OFFICE
CERTIFICATE OF CORRECTION

PATENT NO. : 5,068,274

DATED : 11-26-91

INVENTOR(S) : Howard F. Efner et al

It is certified that error appears in the above-identified patent and that said Letters Patent is hereby corrected as shown below:

Column 18, Table 10, please align the row of numbers "50    53    36    36    89    90" with the entry "g/10 min., 275 °C, 5 Kg" in the first column of the table.

Signed and Sealed this

Twentieth Day of July, 1993

Attest:

MICHAEL K. KIRK

*Attesting Officer*     Acting Commissioner of Patents and Trademarks